United States Patent [19]
Tu et al.

[11] Patent Number: 5,247,235
[45] Date of Patent: Sep. 21, 1993

[54] METHOD OF SUPPLYING POWER TO A SINGLE PHASE STEP MOTOR

[75] Inventors: Mai X. Tu, Chavannes; Michel Schwab, Bienne, both of Switzerland

[73] Assignee: Detra SA, Bienne, Switzerland

[21] Appl. No.: 719,060

[22] Filed: Jun. 18, 1991

Related U.S. Application Data

[63] Continuation of Ser. No. 357,815, May 30, 1989, abandoned.

[30] Foreign Application Priority Data

Jun. 1, 1988 [CH] Switzerland ............... 2073/88

[51] Int. Cl.$^5$ ............................................. H02P 7/06
[52] U.S. Cl. ................................. 318/685; 318/138; 318/430; 368/157; 368/160
[58] Field of Search .............. 318/685, 138, 430; 368/157, 160

[56] References Cited

U.S. PATENT DOCUMENTS

| 3,609,486 | 9/1971 | Feldhoff ............... | 318/430 |
| 4,042,865 | 8/1977 | Gurwicz ............... | 318/269 |
| 4,361,410 | 11/1982 | Nakajima et al. ...... | 368/157 |
| 4,467,256 | 8/1984 | Antognini et al. ..... | 318/696 |
| 4,468,602 | 8/1984 | Antognini et al. ..... | 318/696 |
| 4,542,329 | 9/1985 | Xuan ................... | 318/696 |

FOREIGN PATENT DOCUMENTS

| 0097350 | 1/1984 | European Pat. Off. . |
| 2459579 | 1/1981 | France . |
| 634194 | 1/1983 | Switzerland . |

Primary Examiner—William M. Shoop, Jr.
Assistant Examiner—Brian Sircus
Attorney, Agent, or Firm—Oliff & Berridge

[57] ABSTRACT

Method of supplying power to a single phase step motor of a time-piece, adapted to provide the motor with chopped voltage pulses of time-period $T_6$ variable with respect to the load conditions and to the supply voltage of the motor, characterized in that each said impulsion of chopped voltage is composed of a sequence of elementary pulses of the same polarity and of a constant duration $T_4$, and in that the durations $T_{5i}$ separating the said elementary voltage pulses vary according to load conditions and according to the supply voltage of the motor variable with respect to the load conditions and to the supply voltage of the motor.

The invention finds a field of application in motors for time-pieces.

22 Claims, 8 Drawing Sheets

METHOD OF SUPPLYING POWER TO A SINGLE PHASE STEP MOTOR

This is a continuation of application Ser. No. 07/357,815 filed May 30, 1989, now abandoned.

The object of the present invention is a method of supplying power to a step motor, especially a motor of a time piece.

Several types of supply have already been proposed or used for supplying power to the coil of the motor of a quartz watch. This is the case, for exemple described in Swiss Pat. No. 634,194, where the coil of the motor is supplied with a voltage pulse of constant length and magnitude. This method of supply has the disadvantage of an excessive consumption of energy: in effect, to avoid a poor performance of the motor in the occurrence of a fall in voltage or an increase in the internal resistance of the battery, or even in the case of an increase in the load, the coil of the motor is overpowered under normal operating conditions.

Other solutions have been put forward, allowing the supply of the motor to be adapted according to the load, for example the solution described in French patent 79,16,816.

These solutions have the disadvantage of being obliged to use an analogical missed-step detection circuit and a logical correction circuit, both of which are rather complicated.

Published application EP-00,97,350 discloses a driving method which has for its object to remedy these drawbacks. According to this method, the driving impulses are "chopped" into a series of partial impulses and extend as long as the value of a parameter, which is detected by the driving circuit, does not meet with a predetermined threshold value. Thus, one obtains that every impulse provides a step of advance of the rotor and there is no more "missing steps".

However, the method of the aforementioned publication needs complicated circuits. Furthermore, it does not shorten the consumption of the power source energy as much as possible. The circuits must be arranged in such a way that two different limit values of the current intensity must be detected. It follows that the current intensity cannot increase proportionally with the resistance of the load, as the rotor rotates. Due to the provision of an upper limit for the current the arrangement does not function as economically as possible.

The aim of the present invention is to overcome these above-mentioned drawbacks and to propose a method of supplying power to a step motor allowing the energy provided by the battery to be economised.

The invention will be better understood during the reading of the following description, by referring to the attached diagrams, in which:

FIG. 4a-1 and 4a-2 represents the current in the coil of the motor when it is supplied by a pulse of the type shown in FIG. 3b, the motor not being loaded by a mechanical torque;

FIG. 4b-1 and 4b-2 represents the same current as that of FIG. 4a, but in this case, the motor is loaded with a mechanical torque of 0,2 $\mu$Nm;

FIG. 5a-1 and 5a-2 represents the current and the voltage applied to the coil according to the supply method provided for by the invention, the motor not being loaded by a mechanical torque;

FIG. 5b-1 and 5b-2 represents the current and the voltage applied to the motor according to the same supply method of FIG. 5a, but with the motor loaded by a mechanical torque;

Figure 1:
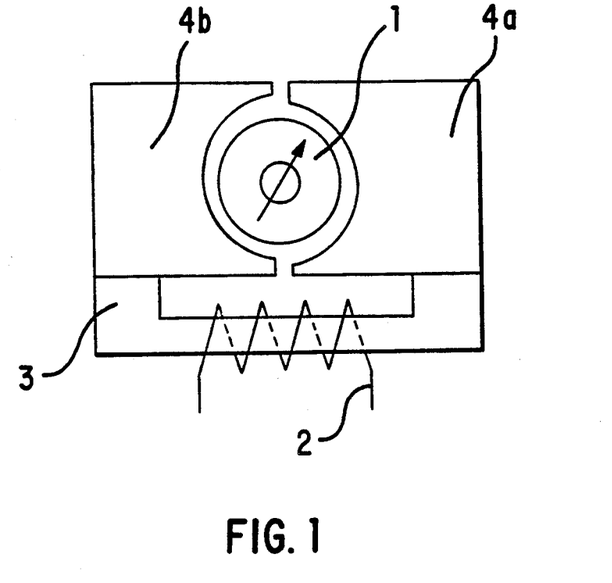
FIG. 1 represents a schematic drawing of a single phase bi-polar step motor.

FIG. 1 schematically shows a principal execution of a bipolar single-phase step-motor. This motor consists of a rotor comprising a cylindrical permanent magnet whose magnetic field is diametrically oriented, of a stator comprising a coil 2, a core of this coil 3 and polar parts 4a and 4b made from soft ferromagnetic material.

Figure 2:
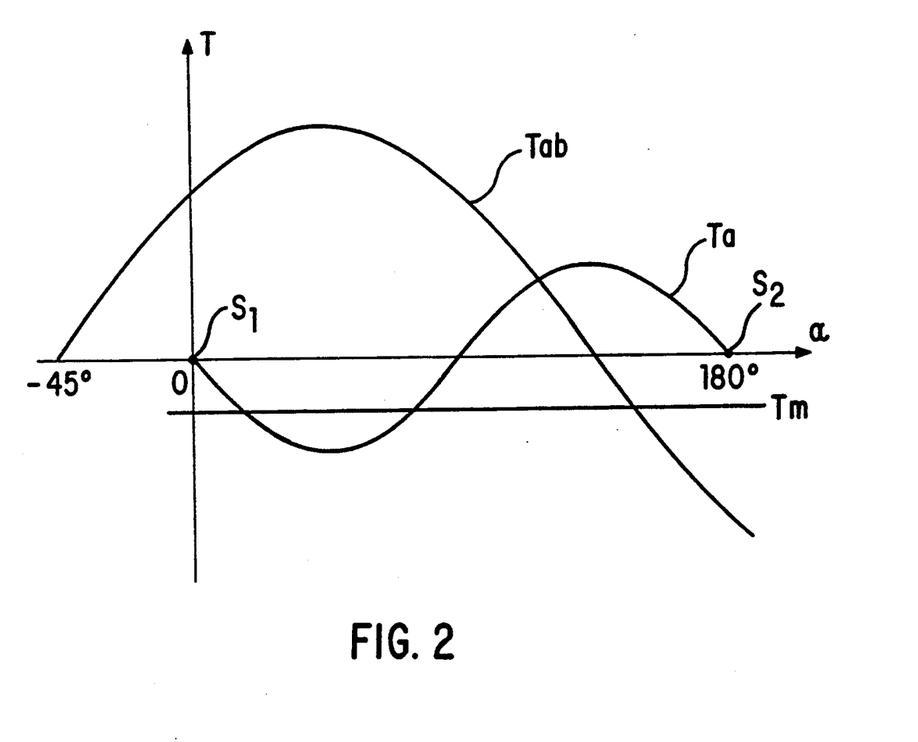
FIG. 2 represents a diagram of static couples of a motor of the above-mentioned type.

FIG. 2 represents the torques acting on the rotor of the motor according to the angular position $\alpha$. The positioning torque $T_a$ results from the interaction between the magnet and the geometry of the polar parts of the stator. The mutual torque $T_{ab}$ results from the interaction between the field created by the coil when it is supplied with power and the magnetic field of the rotor. The torque $T_m$ represents the sum of all the torques of mechanical origin acting on the rotor. This figure shows that the torques $T_a$ and $T_{ab}$ are out of phase by an angle of approximately 45 degrees. At rest, the rotor is initially positioned at the point $S_1$ by means of the torque $T_a$. When a pulse of voltage is sent to the coil, the rotor is displaced in the direction of $S_2$ under the action of the torque $T_{ab}$.

Figure 3A:
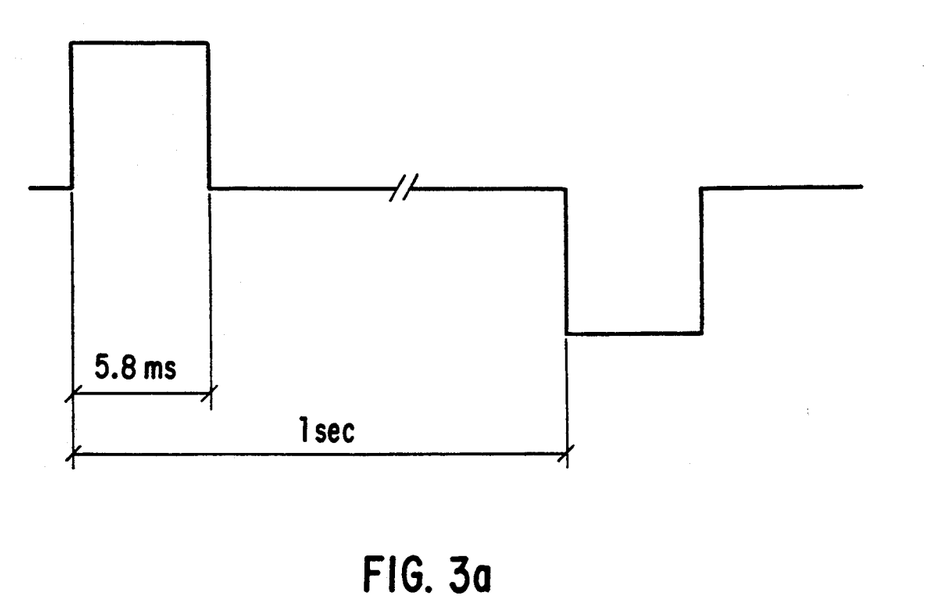
FIG. 3a represents one type of supply pulses to this motor.

According to the prior art, the coil of the motor is fed by a pulse of constant voltage and length, as shown in FIG. 3a. The duration of the pulse is chosen to be sufficiently long, so as to allow the motor to cross the step under unfavourable conditions, such as, for example, in the case of a fall in voltage of the battery, or even in the case of an increase of the mechancal torque $T_m$. However, most of the time, the motor is not loaded and runs at a nominal voltage; the constant and sufficiently long duration thus causes a loss of energy which cannot be used under normal running conditions.

Figure 3B:
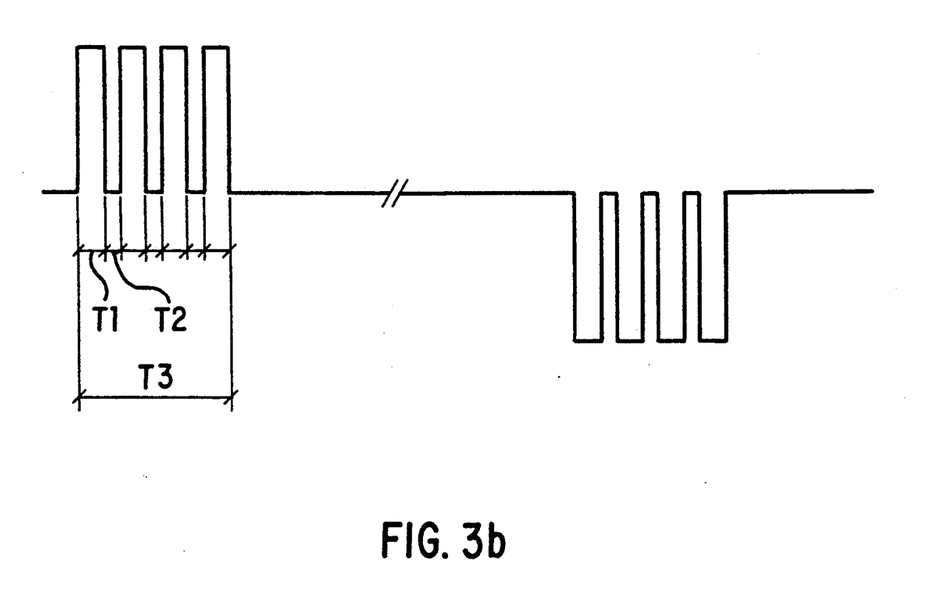
FIG. 3b represents a second type of pulse supply.

FIG. 3b shows a chopped voltage supply in which the total duration $T_3$, together with the periods $T_1$ and $T_2$ are constant. Such a supply, which is fairly well documented in the technical literature, allows the voltage of the battery to be adapted to that of the motor by means of the relation between the periods $T_1/T_2$. However, this type of supply presents the same disadvantages from the point of view of energy consumption as that represented in FIG. 3a, because of the constant durations $T_1$, $T_2$ and $T_3$.

Figure 4A:
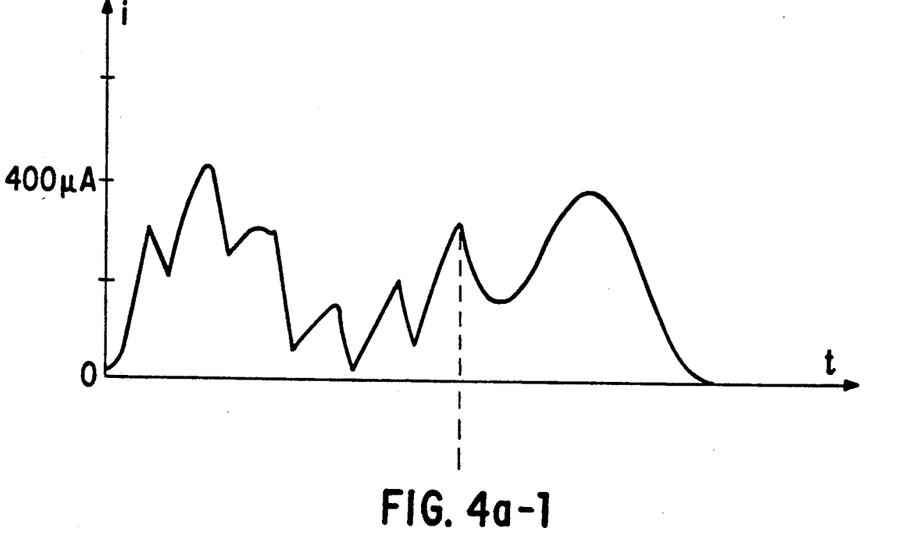
Figure 4A:
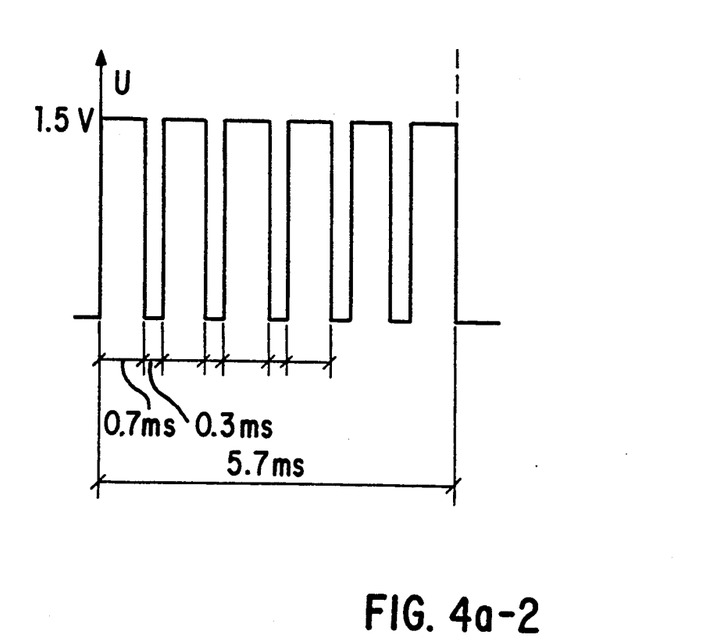
Figure 4B:
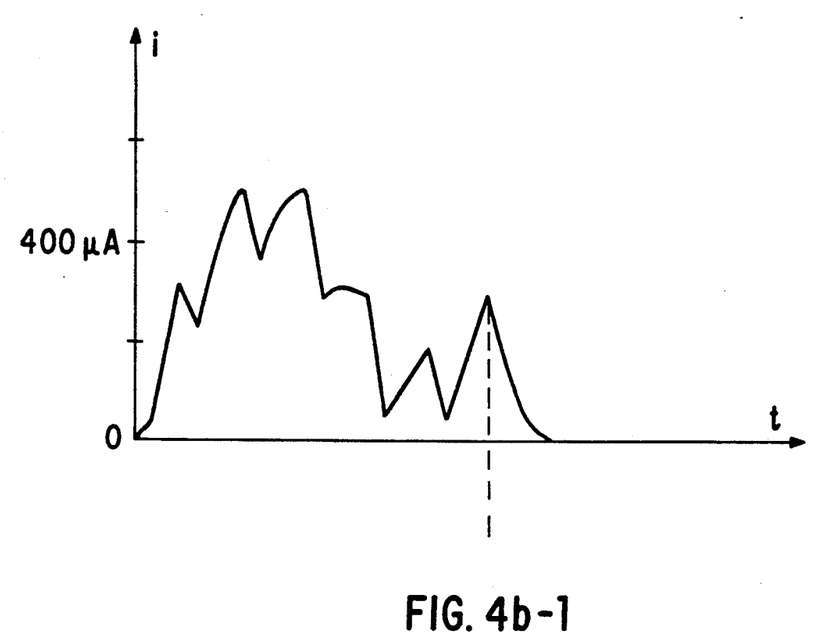
Figure 4B:
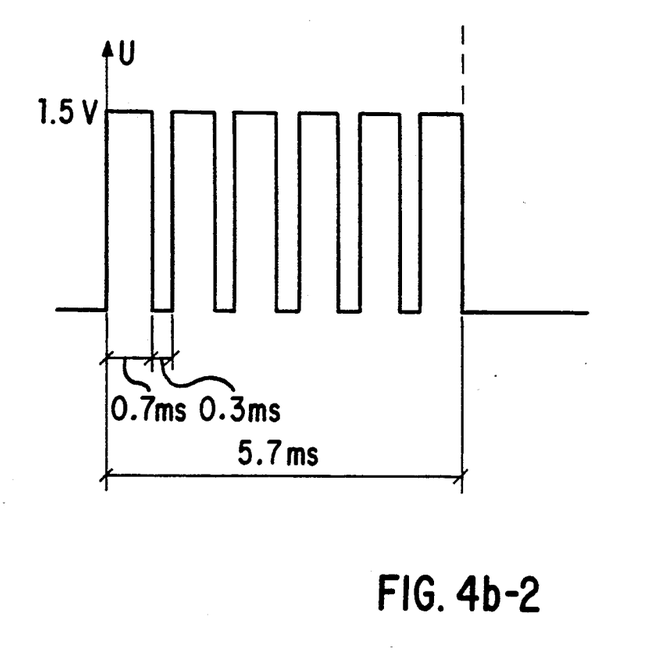

FIG. 4a represents the current, together with the voltage applied to the motor according to the above-mentioned supply method, the motor not being loaded by a mechanical torque, and the periods $T_1$, $T_2$ and $T_3$ have been fixed at 0.7, 0.3 and 5.7 ms, respectively.

Under these conditions, the motor has completed its step, ie., the rotor has made a rotation of 180°.

In FIG. 4b, the same supply has been given as in FIG. 4a, but the latter is loaded by a mechanical torque of 0.2 Nm. In this case, the motor has missed its step and the rotor, after a rotation of an angle of at lest 90°, returns to its initial position.

Figure 5A:
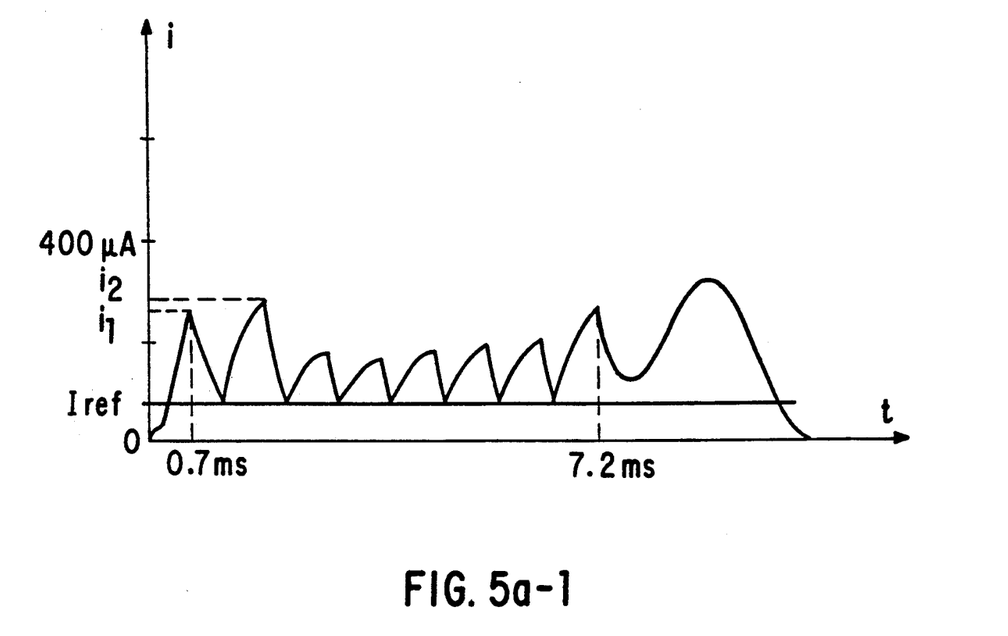
Figure 5A:
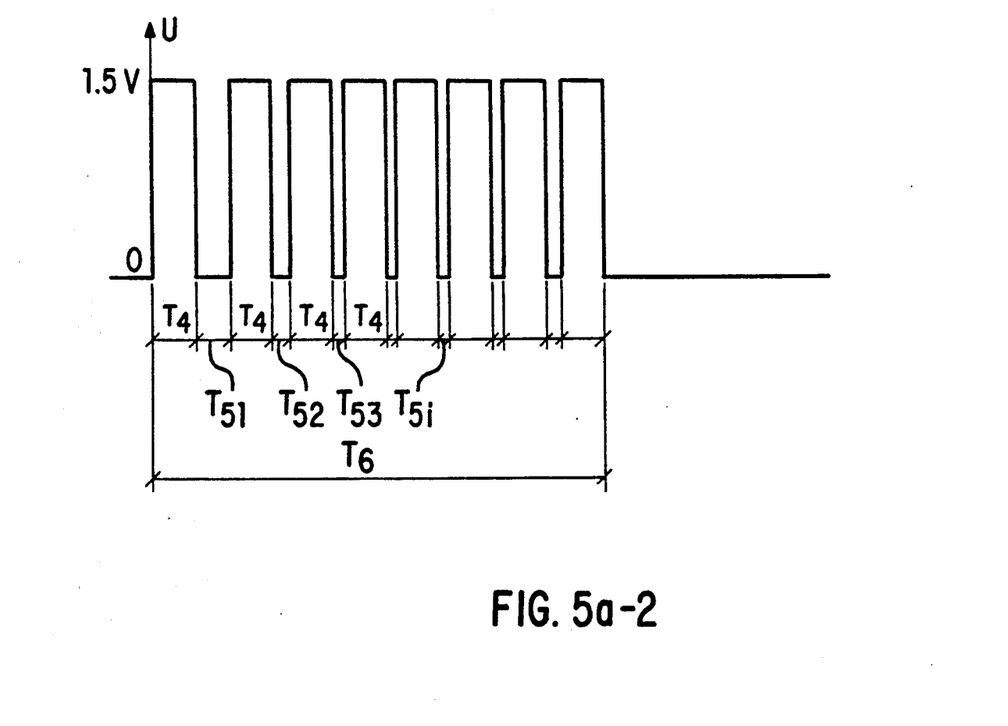
Figure 5B:
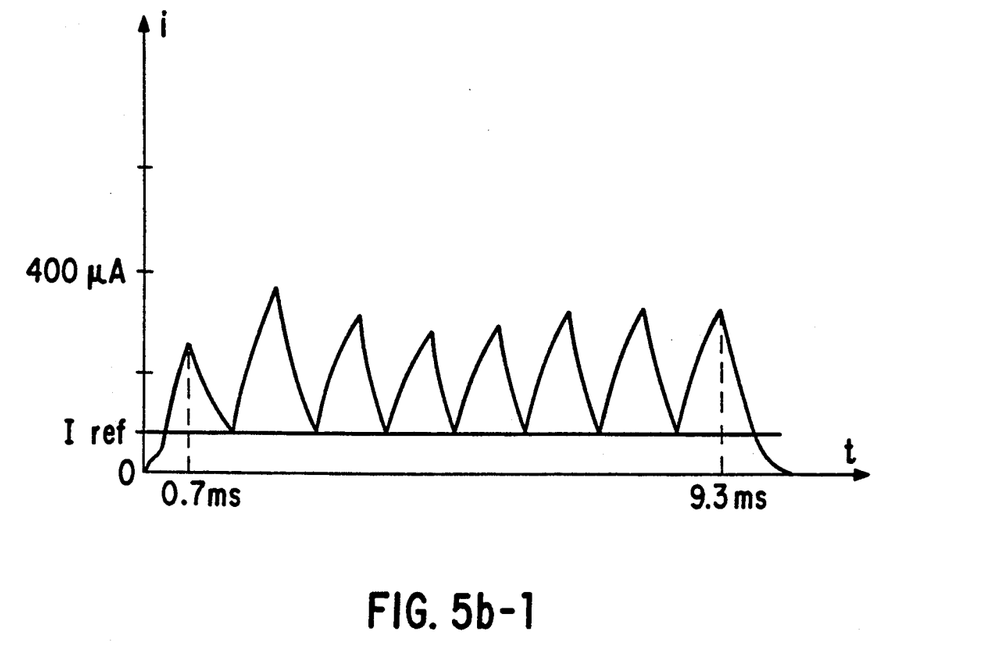
Figure 5B:
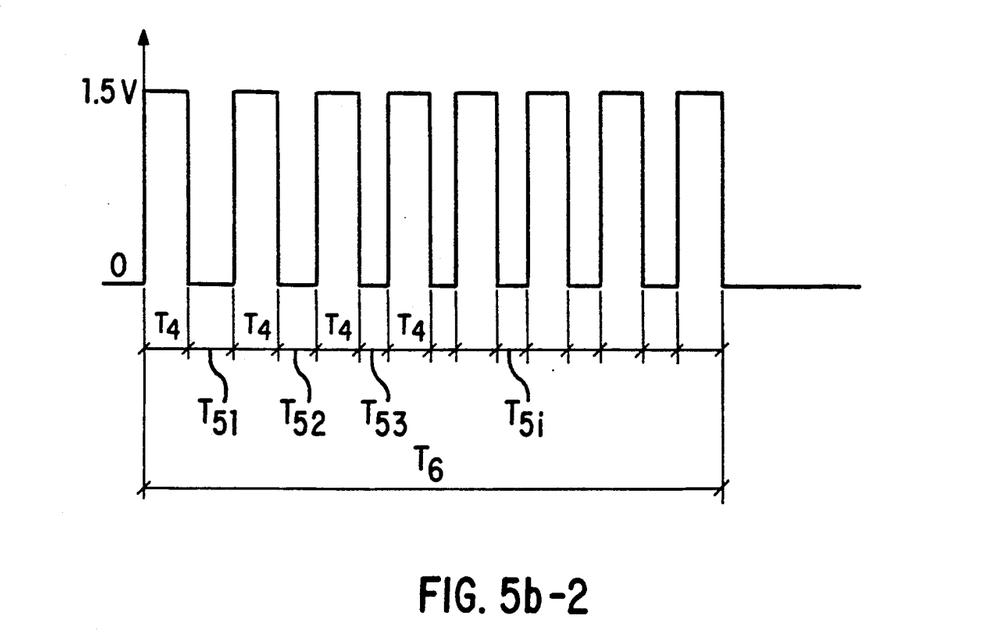

FIG. 5a represents the current and the voltage applied to the coil, according to the supply method described by the present invention, the motor not being loaded by a mechanical torque.

The pulse of the chopped tension of total duration $T_6$ is formed from 8 elementary pulses of constant duration $T_4$ of 0.7 ms, separated by durations $T_{51}, T_{52}, \ldots T_{5i}$ of variable length. The sequence of elementary pulses occurs in the following manner: initially the coil is supplied with a pulse of constant voltage of duration $T_4$ of 0.7 ms, the current in the coil increases from zero to a value $i_1$, according to the voltage equation:

$$U = Ri + L(di/dt) + K \cdot \Omega \tag{1}$$

in which
U = applied voltage
L = inductance
i = current
t = time
K = coupling factor, expressing the variation of the mutual flux between the magnet and the coil
$\Omega$ = angular speed After the first partial (elementary) pulse of voltage, i.e., after $t = T_4$, the coil of the motor is short-circuited. The current in the coil varies, from this moment, according to the equation:

$$0 = Ri + L(di/dt) + K \cdot \Omega \tag{2}$$

When the current drops down to the reference value $I_{ref}$, i.e., at the moment $t = T_4 + T_{51}$, the coil is again supplied by a second elementary pulse of constant voltage of duration $T_4$. The current in the coil increases from the value $I_{ref}$ to the value $i_2$ and the coil of the motor is again short-circuited at the moment when $T = 2 \cdot T_4 + T_{51}$ and so on. In this case of operation, i.e., when the motor is not loaded, the total duration $T_6$ of the chopped voltage is 7.2 ms.

FIG. 5b represents the current and the voltage applied to the motor according to the same supply method as that shown in FIG. 5a, but the motor is loaded by a mechanical torque of 0.2 μNm. The total duration of the pulse $T_6$ increases from the 7.2 ms of the previous situation, to 9.3 ms of the present situation. Thus, there exists an automatic adaptation of the total chopped pulse duration with respect to the load of the motor, and it is owing to this adaptation that the supply method according to the invention allows the economising of the energy provided by the battery.

Figure 6:
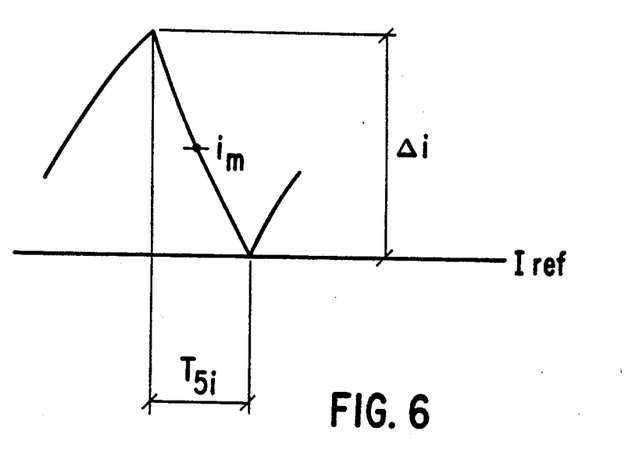
FIG. 6 shows the variation of the current during the duration $T_{5i}$ separating two elementary pulses.

FIG. 6 represents the variation of the current during the duration $T_{5i}$ separating two elementary voltage pulses. The coil of the motor being short-circuited during this duration, consequently the following equation is obtained from equation (2):

$$T_{5i} \approx \frac{L \cdot \Delta i}{Ri_m + k\Omega} \tag{3}$$

The equation (3) shows that the duration $T_{5i}$ depends on the rotation speed of the motor. An increase in the mechanical torque of the motor causes a decrease in the rotation speed $\Omega$, which causes an increase in the duration $T_{5i}$.

The total duration $T_6$ of the chopped impulsion (chopped pulse) is given by:

$$T_6 = n \cdot T_4 + \sum_{i=1}^{n-1} T_{5i} \tag{4}$$

In this equation, n represents the total number of elementary pulses of duration $T_4$ (n = 8 in the example shown in FIGS. 5a and 5b).

Equations (3) and (4) explain the adaption of the length of the pulse with respect to the load by the supply method described in the present invention.

Figure 7:
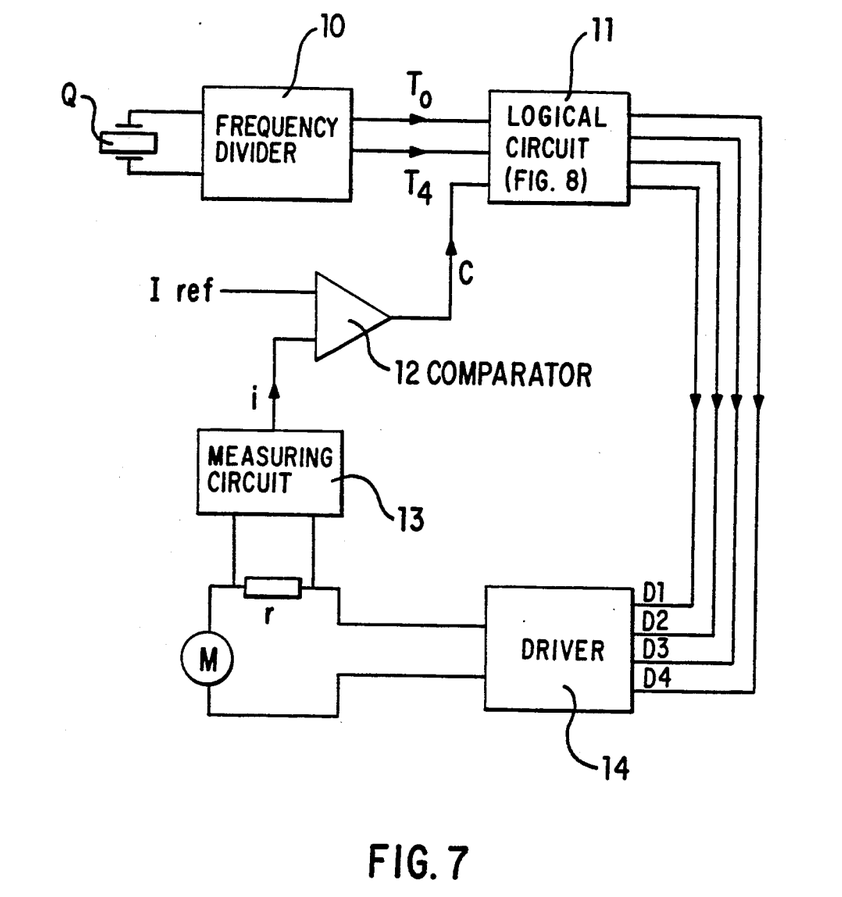
FIG. 7 represents a block diagram of an example of an embodiment of the supply method according to the invention.

FIG. 7 is a block diagram showing an embodiment of the control circuit for a one-phase step motor of the present invention. An oscillator Q provides a time base signal which is sent to a frequency divider and shaping circuit 10. Circuit 10 produces a signal $T_0$ representing a main pulse period for controlling a step motor M and a signal $T_4$ representing auxiliary periods having a predetermined length, which is a fraction of the length of the main periods $T_0$. The auxiliary pulses $T_4$ are also designated here as "elementary pulses".

Figure 8:
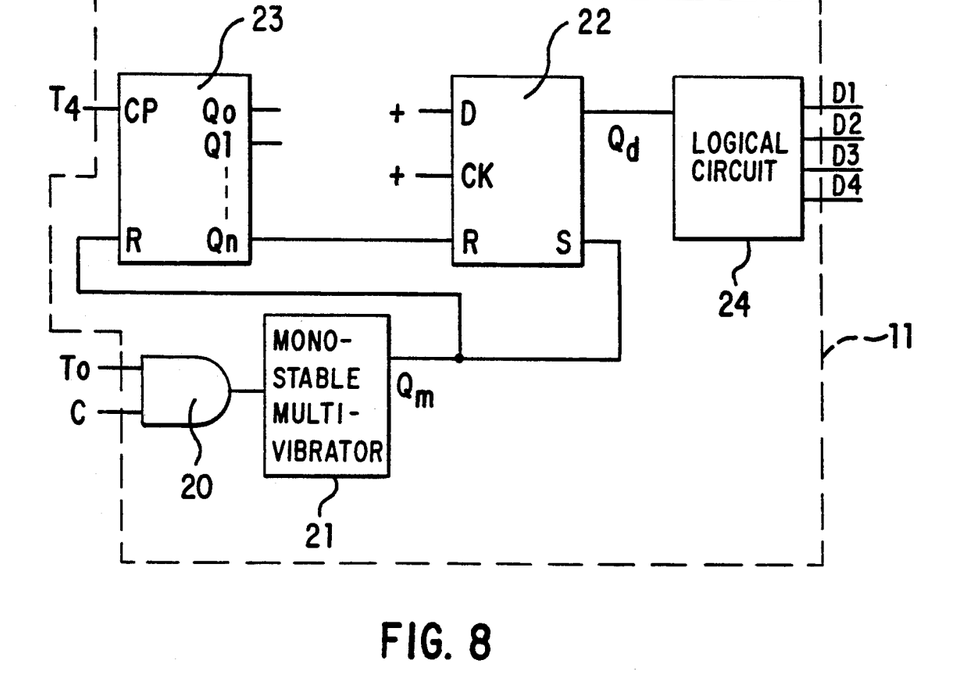
FIG. 8 represents a detail of the element 11 of the block diagram of FIG. 7.
Figure 9:
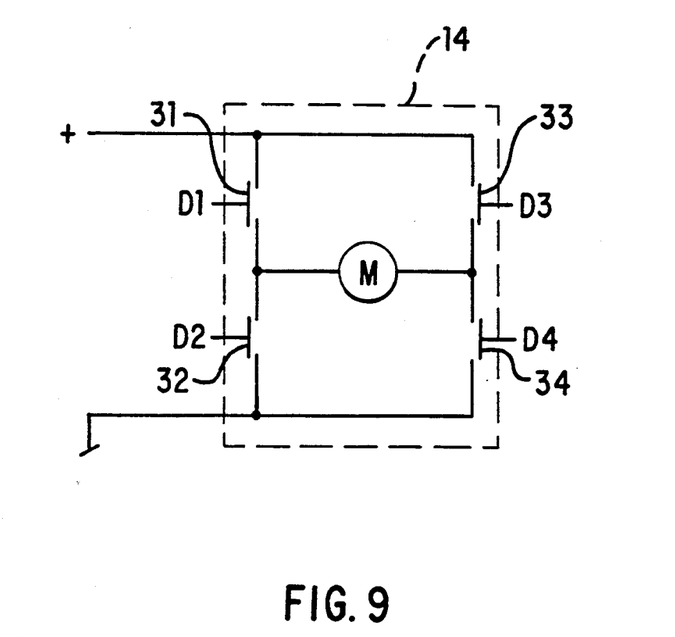
FIG. 9 represents a detail of the element 14 of the block diagram of FIG. 7.

The step motor M is a one-phase step motor of the type shown in FIG. 1. Its coil is energized by chopped pulses $T_6$ coming out at the output of driving circuit 14 with a frequency determined by the periods $T_0$. A resistor r is connected in series with the step motor M. Both sides of that resistor r are connected to a measuring block 13, the output of which provides a signal transformed from the voltage drop in resistor r and giving an image of a load parameter of step motor M, e.g., the current i in the motor coil. A comparator 12 receives the output of measuring block 13 and the reference value $I_{ref}$ referred to in the foregoing paragraphs describing FIGS. 5A, 5B, and 6. Comparator 12 provides a signal C which is fed, together with signals $T_0$ and $T_4$, to a logical circuit 11, an example of which is represented in FIG. 8. Circuit 11 controls the on- and off-states of step motor M by providing driving signals $D_1$, $D_2$, $D_3$, $D_4$ to driving circuit 14. As shown in FIG. 9, said circuit comprises four output transistors 31, 32, 33, 34 arranged in a H-bridge and controlled by signals $D_1$, $D_2$, $D_3$, $D_4$. The circuit arrangement of FIG. 7 and FIG. 9 insures an automatic adaptation of the length of the chopped pulses $T_6$ to the effective load on the motor 7, by detecting the length of the time intervals $T_{5i}$ during which the current i undergoes a drop $\Delta i$ from a value obtained at the end of an elementary pulse $T_4$ down to the reference value $I_{ref}$.

FIG. 8 represents an example of the different components of circuit 11 in FIG. 7. According to that example, circuit 11 comprises and "AND" gate 20, a monostabel multivibrator 21, a D flip-flop 22, a counter 23 and a classical logical circuit 24. Signals $T_0$ and C are sent to gate 20 the output of which is provided to monostable vibrator 21. The output $Q_m$ of multivibrator 21 simultaneously causes setting (S) of D flip-flop 22 and resetting to zero (R) of counter 23. An output $Q_n$ of counter 23 is connected to R input of flip-flop 22. The output $Q_d$ of D flip-flop 22 controls circuit 24 to provide control signals $D_1$, $D_2$, $D_3$, and $D_4$, which control transistors 31 to 34, in such a manner that a predetermined sequence of n elementary driving pulses $T_4$, separated by intervals $T_{5i}$ of variable length, forms each chopped pulse $T_6$ appearing with the frequency $T_0$. During the interval $T_{5i}$, driving circuit 14 provides short-circuiting of the motor coil.

Referring to FIG. 9, four switches 31-34 advantageously provide both polarity control of the chopped pulse applied to step motor M during each elementary pulse and shorting of the coil of motor M during the intervals $T_{5i}$. During periods $T_4$, step motor M is to be energized and switches 31 and 34 or switches 33 and 32 are charged to an on-state by signals $D_1$ and $D_4$ or $D_3$ and $D_2$ respectively. Thus, the pairs of switches provide the same voltage to the coil of motor M. but produce voltages across the coil having opposite polarities. Switches 31-34 also provide features for short circuiting the coil of motor M. In an exemplary case, switches 31 and 34 are in the on-state to provide power to motor M during interval $T_4$. During interval $T_{5i}$, command signal D2 is applied to switch 32 while command signal D1 changes switch 31 to the off-state. Thus, switches 32 and 34 cooperate to short circuit the coil of motor M.

It will be appreciated that other modifications to circuit 11 are possible, thereby providing additional control of elementary pulses and intervals $T_{5i}$. In one aspect of the invention, when $T_{5i}$ exceeds a predetermined value $T_{ref}$, the chopped voltage pulse is interrupted. According to another aspect of the invention, driving circuit 14 is activated to short circuit motor M when the number of auxiliary pulses $T_4$ exceeds a predetermined number. According to yet another aspect of the invention, driving circuit 14 short circuits the coil of step motor M when the sum of auxiliary periods $T_4$ and intervals $T_{5i}$ exceed a predetermined maximum value. It will be further appreciated that circuit 11 is adaptable to inhibit auxiliary pulses $T_4$ whenever either the predetermined number or predetermined maximum value is exceeded.

FIG. 5a also shows that when the motor is not loaded, the current at the end of the chopped pulse takes a considerable time with respect to the other values of $T_{5i}$ to drop to the value $I_{ref}$.

The measurements have shown that the increase in duration appear when the motor has easily made its step; from this fact, it is useless to continue supplying current after the appearance of this phenomenon.

What is claimed is:

1. A method for supplying current to a single phase step motor of a time piece, said motor having a coil, adapted to provide the motor with voltage pulses having a main pulse period of duration $T_0$ and having the form of chopped pulses of duration $T_6$ which is variable according to the load conditions and according to the voltage supply of the motor, comprising the steps of:
   providing each chopped pulse as a sequence of elementary pulses to a driving circuit of the motor, said elementary pulses having a voltage of the same polarity and having a constant duration $T_4$; and
   varying the separation between pulses in each said sequence of elementary pulses by an interval of time $T_{5i}$ having a variable duration responsive to the load on said motor and the supply voltage and said motor.

2. The method of claim 1, wherein the coil of the motor is short-circuited during said intervals of time $T_{5i}$.

3. The method according to claim 1, wherein each said interval of time $T_{5i}$ is delimited at one end by said elementary pulse of constant duration $T_4$ and at a second end by the instant when the current in the coil of the motor is smaller than or equal to a reference value $I_{ref}$.

4. The method according to claim 1, wherein said chopped pulse is composed of a constant number of elementary pulses.

5. The method according to claim 1 further including the step of interrupting said chopped pulse when the said duration of said interval of time $T_{5i}$ exceeds a predetermined maximum value.

6. The method according to claim 1, further including the step of short-circuiting the coil of the motor between two of said chopped pulses.

7. The method according to claim 6, applied to a time piece motor fed with successive chopped pulses of duration $T_6$, wherein said providing step further comprises the step of applying elementary pulses having the same polarity to the motor.

8. The method according to claim 6, applied to a time piece motor fed with successive chopped pulses of duration $T_6$, wherein said providing step further comprises the step of applying to the motor elementary pulses within each chopped pulse having a polarity opposite to a polarity of elementary pulses within the immediately preceding chopped pulse.

9. A motor control circuit for applying a plurality of chopped pulses to a single phase step motor, comprising:
   generating means for providing both main pulse periods succeeding one another with a fixed frequency and auxiliary pulse periods having a fixed predetermined duration which is a fraction of the duration of one of said main pulse periods;
   sensor means responsive to a load parameter of said step motor for providing a signal indicative of said load;
   comparator means coupled to said sensor means receiving said signal indicative of said load for providing an output signal when said signal is greater than or equal to a reference value;
   control logic means coupled to said comparator means and said generating means so as to initiate an auxiliary pulse period only during said main pulse period when said comparator means provides said output signal, for generating driving signals for use in controlling said motor; and
   driving means coupled between said control logic means and said step motor for alternately connecting said step motor to a power source and then short circuiting said step motor, said driving means comprising a plurality of switches activated by said driving signals so as to apply a plurality of successive elementary pulses during each of said main pulse periods, said elementary pulses being separated by a time interval which varies in accordance with the time necessary for said motor load parameter to reach said reference value after each successive elementary pulse, the coil of the motor being short-circuited during said time interval.

10. The motor control circuit according to claim 9, wherein said driving means is actuated to connect power to the step motor during each auxiliary pulse period and actuated to short-circuit the step motor during each variable time interval after each said auxiliary pulse period.

11. The motor circuit according to claim 9, wherein said driving means is actuated to short-circuit the step motor during each fixed time interval between said main pulse periods.

12. The motor control circuit according to claim 9, wherein said load parameter is a current intensity in said motor and wherein said reference value is a predetermined minimal current intensity value.

13. The motor control circuit according to claim 9, wherein said control logic means is further responsive to the number of auxiliary pulse periods occurring within a main pulse period for inhibiting the generation of an auxiliary pulse period whenever said number of auxiliary pulse periods exceeds a predetermined number.

14. The motor control circuit according to claim 9, wherein said control logic means is further responsive to a duration of said variable time interval between each successive auxiliary pulse period for inhibiting the generation of successive auxiliary pulse periods when said duration exceeds a predetermined value.

15. The motor control circuit according to claim 9, wherein said driving means comprises a plurality of transistorized switches arranged to alternatively connect a coil of said step motor to a power source and to short-circuit the coil of said step motor.

16. The motor control circuit according to claim 9, wherein said driving means is actuated in response to said control logic means such that the polarity of said power source as applied to a coil of said step motor is reversed with respect to said coil for each successive main pulse period.

17. The motor control circuit according to claim 9, wherein said driving means is actuated in response to said control logic means such that a coil of said step motor is always connected to the same polarity of said power source during each successive main pulse period.

18. The motor control circuit according to claim 9, wherein said driving means is actuated to short-circuit the motor whenever said number of auxiliary pulse periods exceeds a predetermined number.

19. The motor control circuit according to claim 9, wherein said control logic means is responsive to the sum of the durations of each successive auxiliary pulse period and each successive variable time period for inhibiting the generation of successive auxiliary pulse periods when said sum exceeds a predetermined maximum.

20. The motor control circuit according to claim 9, wherein said driving means is actuated to short-circuit the motor whenever said variable time interval between each successive auxiliary pulse periods exceeds a predetermined value.

21. The motor control circuit according to claim 9, wherein said driving means is actuated to short-circuit the motor whenever the sum of each successive auxiliary pulse period and said variable time intervals between each successive auxiliary pulse period exceeds a predetermined maximum.

22. A control circuit for a one phase step motor, comprising:
   a plurality of feeding terminals;
   a plurality of motor terminals;
   a plurality of switches;
   connector means including said switches for connecting said motor terminals to said feeding terminals, wherein said connector means commutates the motor between an off-state and at least one on-state by controlling the states of said switches;
   time counting means for providing main pulse periods ($T_0$) succeeding one another with a fixed frequency and auxiliary periods ($T_4$) each having a predetermined duration, said predetermined duration being a fraction of the duration of said main pulse periods;
   a sensor used for sensing a load parameter of the motor;
   a comparator coupled to said sensor whereby said comparator provides a signal for commutating the motor to said on-state when a threshold value exceeds said load parameter; and
   controller means operatively coupled to said switches for providing a plurality of elementary pulses during each of said main pulse periods so that said elementary pulses have i) a duration corresponding to the duration of said auxiliary periods during which the motor is in said on-state and ii) time intervals ($T_{5i}$) having a variable duration determined by said comparator interposed between said elementary pulses during which the motor is in said off-state, and so that each main pulse period includes a residual time interval constituting the remainder of the main pulse period, not including said elementary pulses and said time intervals $T_{5i}$, during which residual time interval the motor is in said off-state.

* * * * *